United States Patent
Park et al.

(10) Patent No.: US 10,334,523 B2
(45) Date of Patent: Jun. 25, 2019

(54) METHOD FOR MANAGING POWER OF WIRELESS TERMINAL IN WIRELESS LOCAL AREA NETWORK AND WIRELESS TERMINAL USING THE SAME

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/699,971

(22) Filed: Sep. 8, 2017

(65) Prior Publication Data

US 2018/0132178 A1 May 10, 2018

Related U.S. Application Data

(60) Provisional application No. 62/419,351, filed on Nov. 8, 2016.

(51) Int. Cl.
*H04W 4/00* (2018.01)
*H04W 52/02* (2009.01)
*H04W 84/12* (2009.01)

(52) U.S. Cl.
CPC ........ *H04W 52/0216* (2013.01); *H04W 84/12* (2013.01); *Y02D 70/00* (2018.01);
(Continued)

(58) Field of Classification Search
CPC .......................... H04W 52/0216; H04W 84/12
See application file for complete search history.

(56) References Cited

U.S. PATENT DOCUMENTS

| 2013/0223308 A1* | 8/2013 | Chandra | ............. | H04W 52/028 |
| | | | | 370/311 |
| 2014/0036746 A1* | 2/2014 | Mannemala | ...... | H04W 52/0216 |
| | | | | 370/311 |

(Continued)

OTHER PUBLICATIONS

IEEE LAN/MAN Standards Committee of the IEEE Computer Society, "Draft Standard for Information Technology—Telecommunications and Information Exchange Between Systems Local and Metropolitan Area Networks—Specific Requirements," IEEE P802.11ax/D1.0, Nov. 2016, 453 pages.

*Primary Examiner* — Clemence S Han
(74) *Attorney, Agent, or Firm* — Lee Hong Degerman Kang & Waimey

(57) ABSTRACT

A method for managing power of a wireless terminal in a wireless local area network (WLAN) system according to one embodiment includes: transmitting, by a first wireless terminal that switches between an awake state and a doze state based on a power save mode for power management, a target wake time (TWT) request frame for requesting first target beacon transmission time (TBTT) information, which indicates a reception time of a first beacon frame, and listen interval information, which indicates a reception interval for a subsequent beacon frame, to a second wireless terminal; receiving, by the first wireless terminal, a TWT response frame including the first TBTT information and the listen interval information from the second wireless terminal in response to the TWT request frame; switching, by the first wireless terminal, to the doze state after receiving the TWT response frame; switching, by the first wireless terminal, to the awake state according to the first TBTT information in order to receive the first beacon frame; and switching, by the first wireless terminal, to the doze state after receiving the first beacon frame.

7 Claims, 16 Drawing Sheets

(52) U.S. Cl.
CPC .............. *Y02D 70/10* (2018.01); *Y02D 70/14* (2018.01); *Y02D 70/142* (2018.01); *Y02D 70/22* (2018.01)

(56) References Cited

U.S. PATENT DOCUMENTS

| | | | |
|---|---|---|---|
| 2017/0195954 A1* | 7/2017 | Ghosh | H04W 52/0216 |
| 2017/0359300 A1* | 12/2017 | Patil | H04L 61/1541 |
| 2018/0184285 A1* | 6/2018 | Patil | H04L 61/2038 |

* cited by examiner

FIG. 1
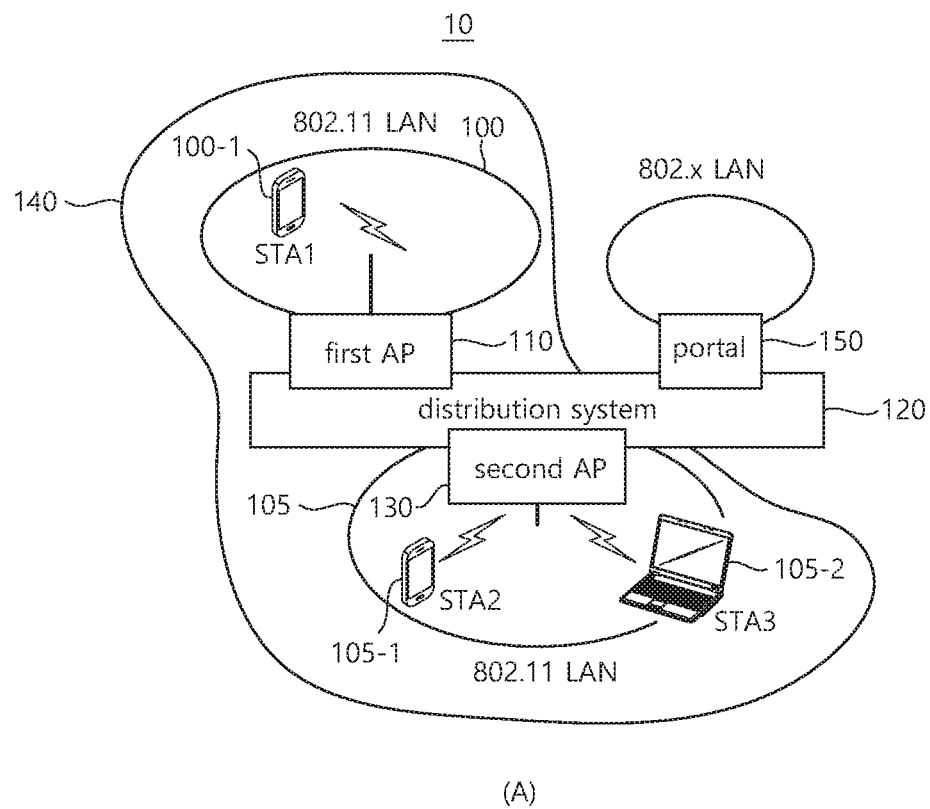
(A)
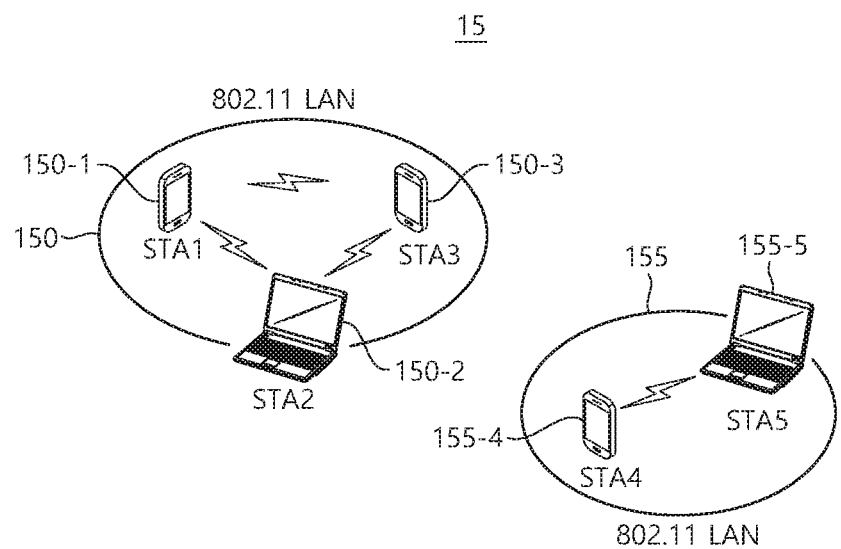
(B)

METHOD FOR MANAGING POWER OF WIRELESS TERMINAL IN WIRELESS LOCAL AREA NETWORK AND WIRELESS TERMINAL USING THE SAME

CROSS-REFERENCE TO RELATED APPLICATIONS

Pursuant to 35 U.S.C. § 119(e), this application claims the benefit of U.S. Provisional Patent Application No. 62/419,351, filed on Nov. 8, 2016, the contents of which are hereby incorporated by reference herein in its entirety.

BACKGROUND OF THE INVENTION

Field of the Invention

The present invention relates to wireless communication, and more particularly, to a method for managing the power of a wireless terminal in a wireless local area network system, and a wireless terminal using the same.

Related Art

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment which an interference source exists, a dense heterogeneous network environment, and an environment in which a high user load exists.

In the next-generation WLAN, a dense environment having a great number of access points (APs) and stations (STAB) is primarily considered. Discussions have been conducted on improvement in spectrum efficiency and area throughput in this dense environment. The next-generation WLAN pays attention to actual performance improvement not only in indoor environment but also in an outdoor environment, which is not significantly considered in the existing WLAN.

Specifically, scenarios for a wireless office, a smart home, a stadium a hotspot, and the like receive attention in the next-generation WLAN. Discussions are ongoing on improvement in the performance of a WLAN system in the dense environment including a large number of APs and STAs based on relevant scenarios.

SUMMARY OF THE INVENTION

The present specification relates to a method for managing the power of a wireless terminal in a wireless local area network (WLAN) system. A method for managing power of a wireless terminal in a wireless local area network (WLAN) system according to one embodiment includes: transmitting, by a first wireless terminal that switches between an awake state and a doze state based on a power save mode for power management, a target wake time (TWT) request frame for requesting first target beacon transmission time (TBTT) information, which indicates a reception time of a first beacon frame, and listen interval information, which indicates a reception interval for a subsequent beacon frame, to a second wireless terminal; receiving, by the first wireless terminal, a TWT response frame including the first TBTT information and the listen interval information from the second wireless terminal in response to the TWT request frame; switching, by the first wireless terminal, to the doze state after receiving the TWT response frame; switching, by the first wireless terminal, to the awake state according to the first TBTT information in order to receive the first beacon frame; and switching, by the first wireless terminal, to the doze state after receiving the first beacon frame.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
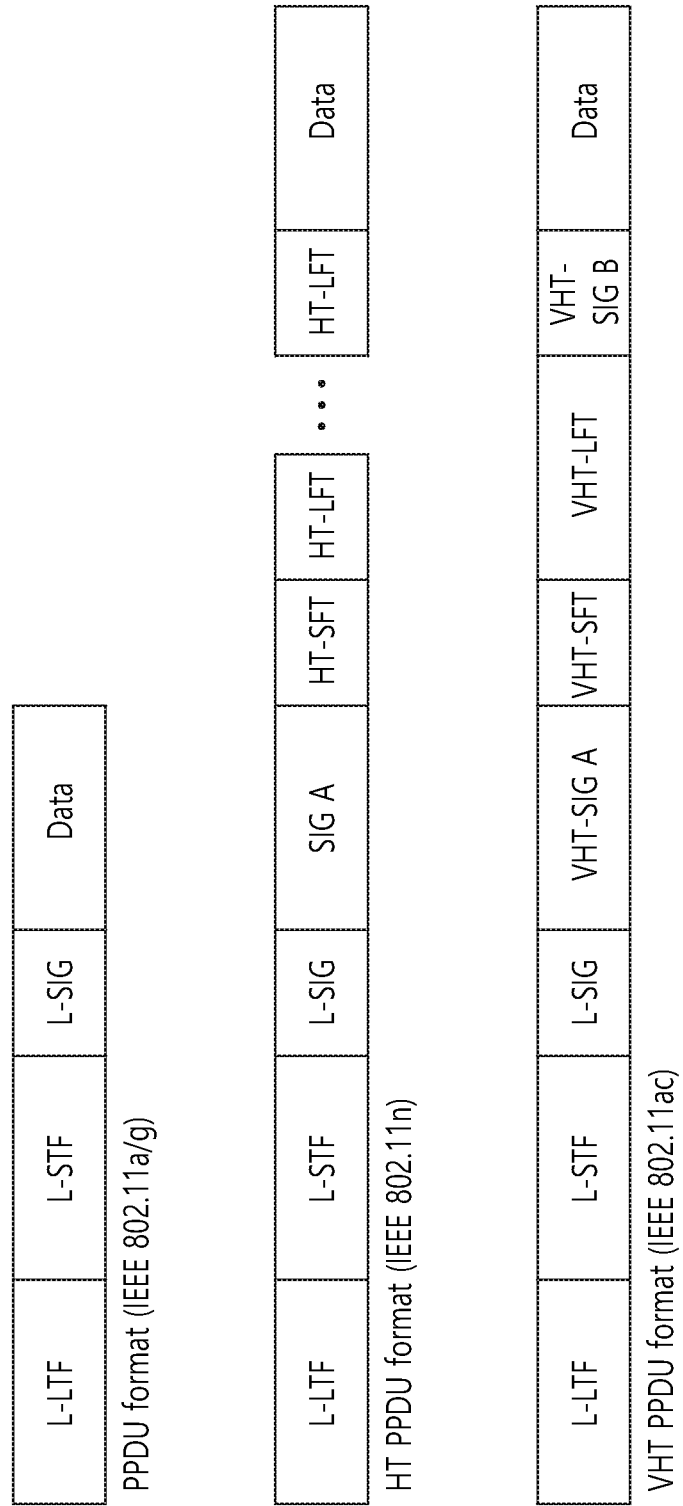
FIG. 2 is a diagram illustrating an example of a PPDU used in an IEEE standard.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system (10) of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
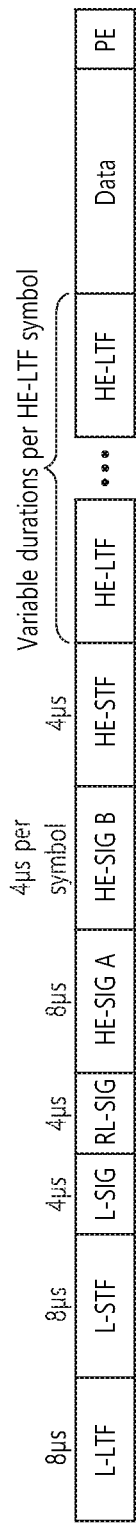
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
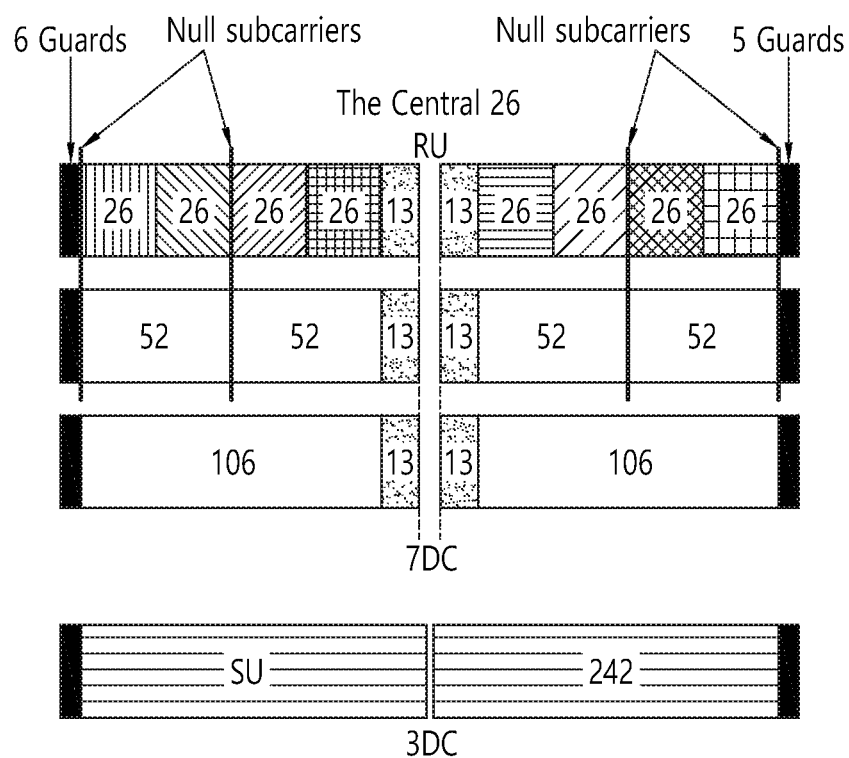
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
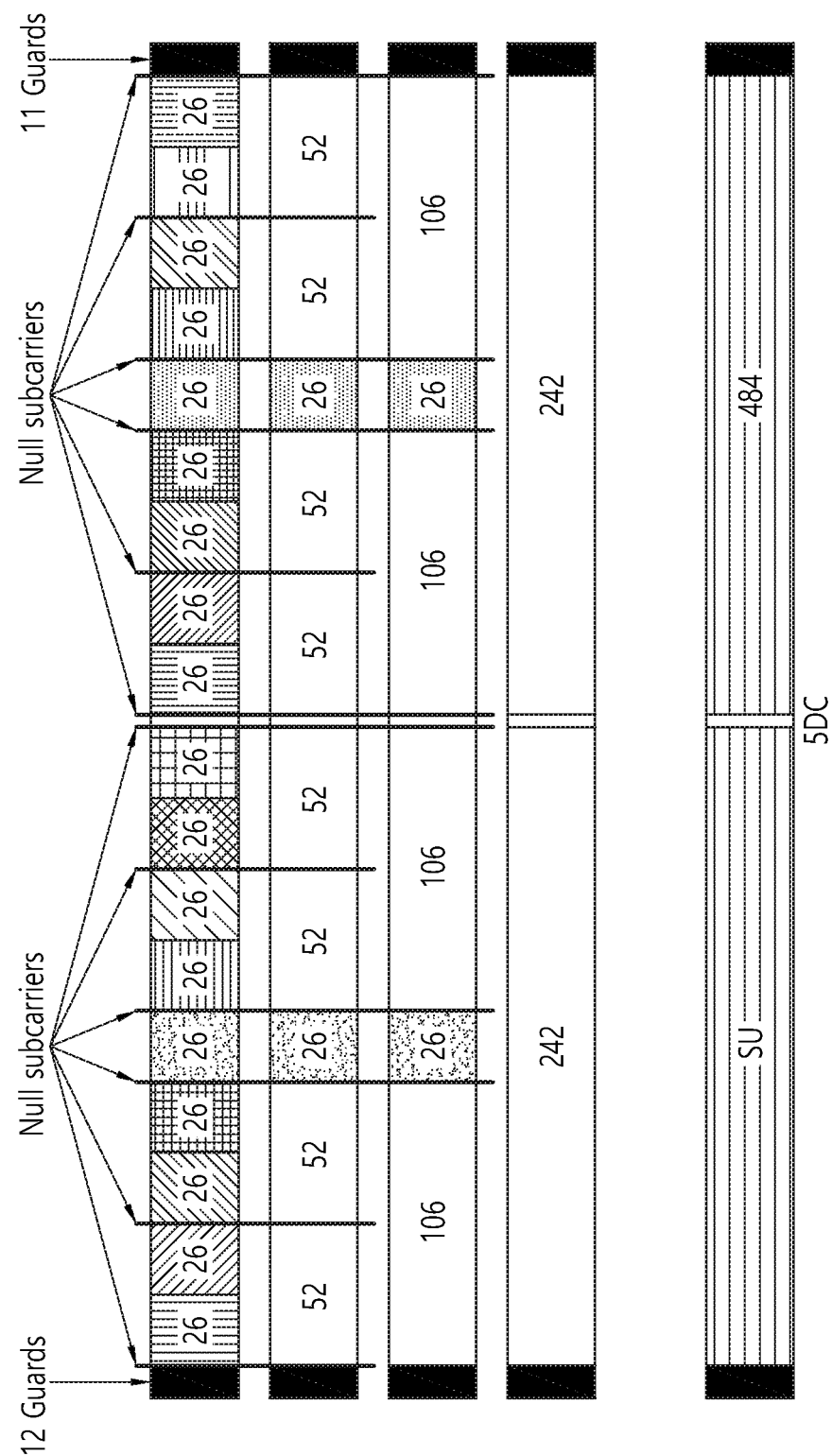
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
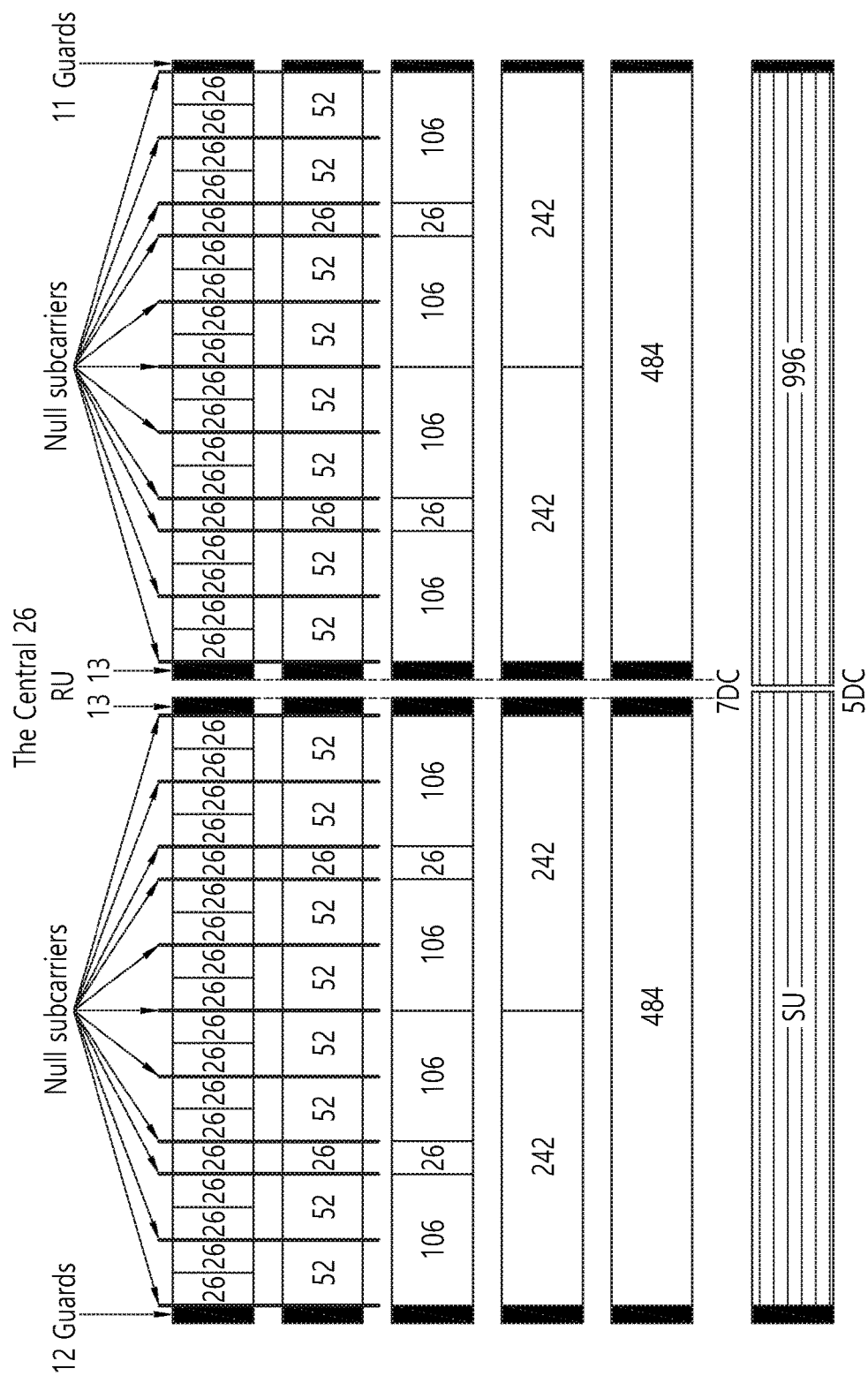
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
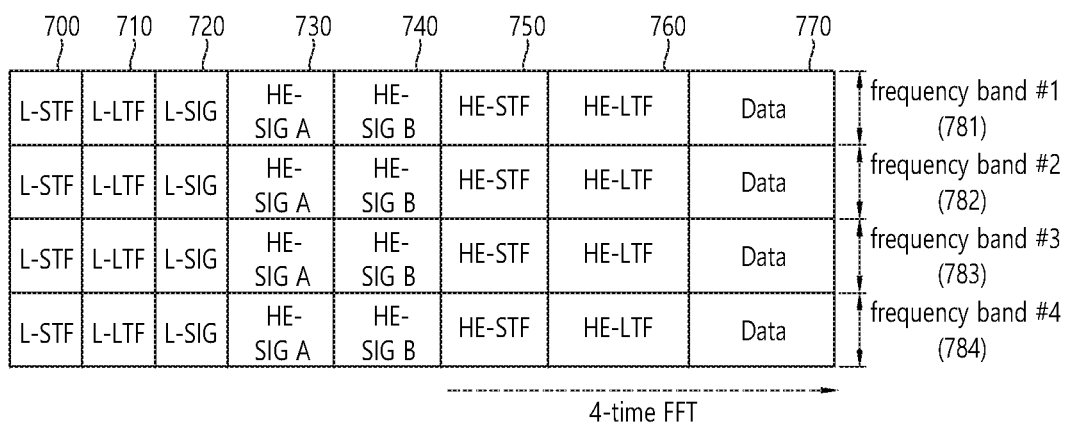
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
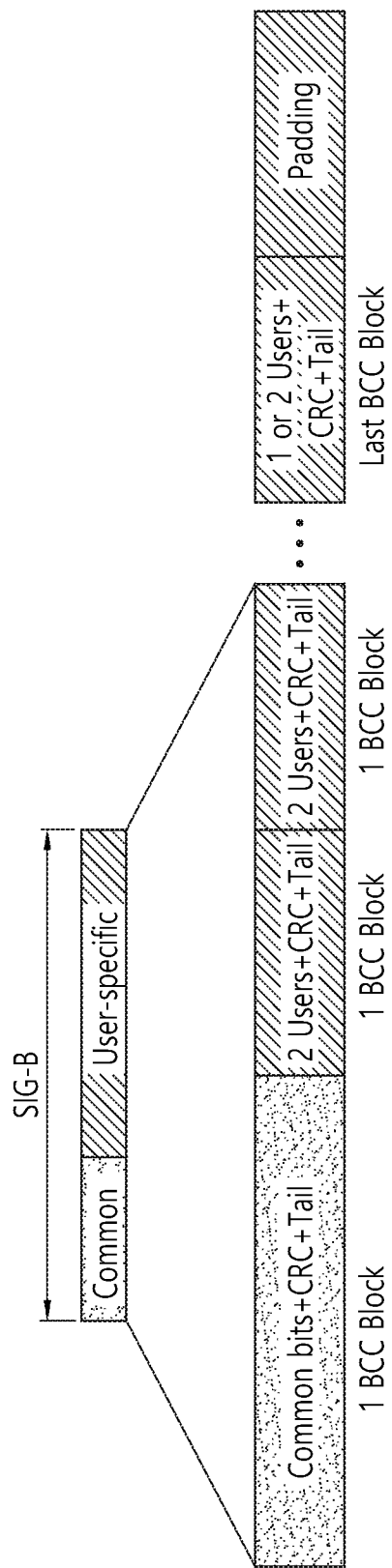
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows there behind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
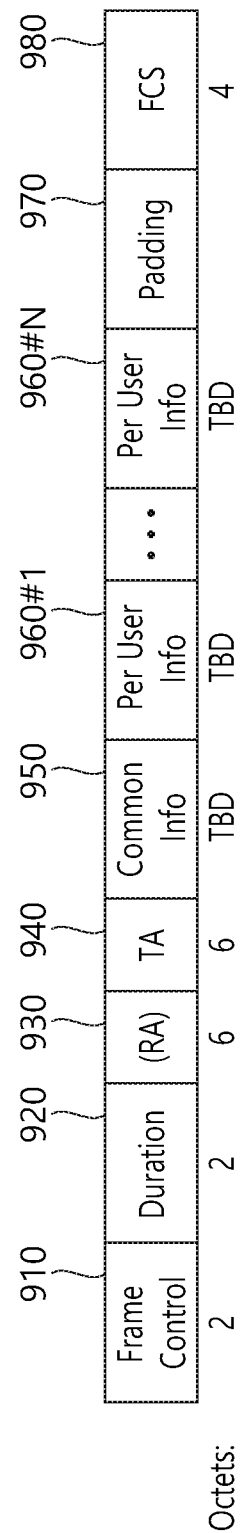
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
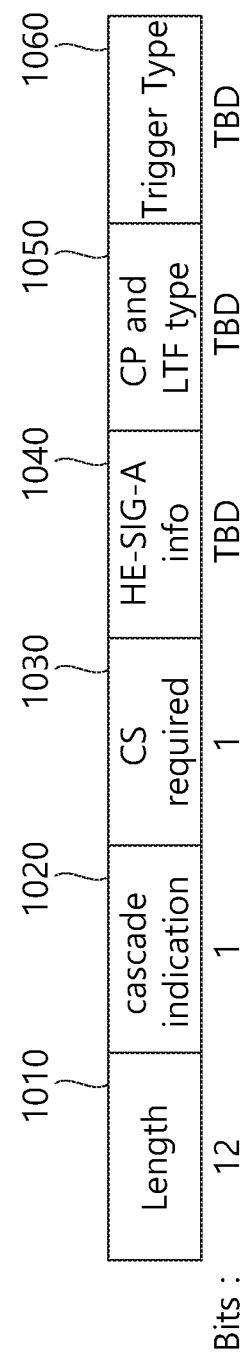
FIG. 10 illustrates an example of a common information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
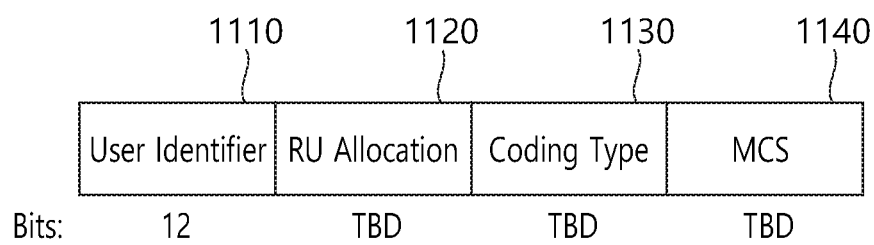
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding may is applied to the uplink PPDU, the coding type field 1130 may be set to '1', and when the LDPC coding is applied, the coding type field 1130 may be set to '0'.

Figure 12:
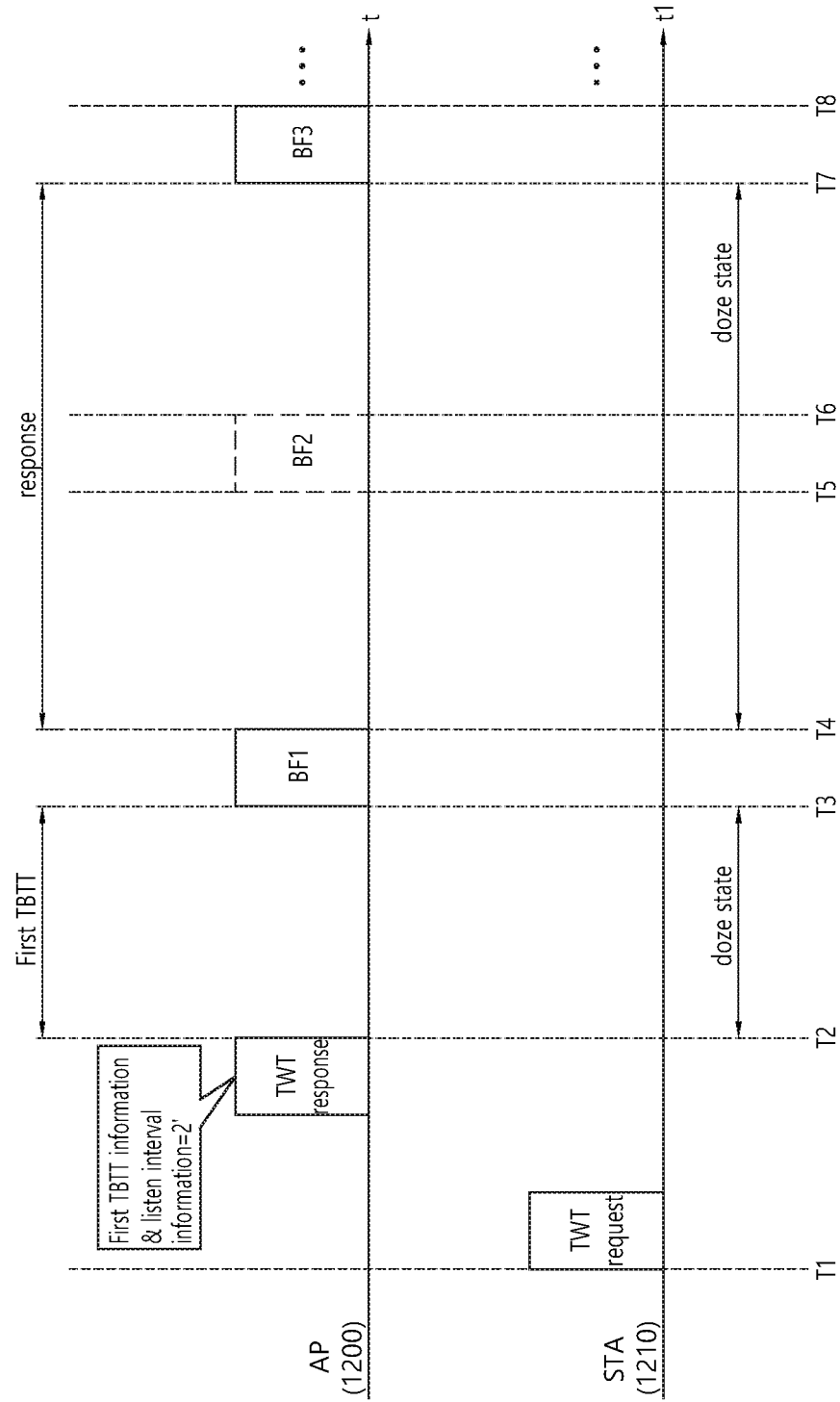
FIG. 12 illustrates a method for managing the power of a wireless terminal in a WLAN system according to one embodiment.

FIG. 12 illustrates a method for managing the power of a wireless terminal in a WLAN system according to one embodiment.

Referring to FIGS. 1 to 12, the horizontal axis of an AP 1200 may denote time (t), and the vertical axis of the AP 1200 may be associated with the presence of a frame transmitted by the AP 1200. The horizontal axis of an STA 1210 may denote time (t1), and the vertical axis of the STA 1210 may be associated with the presence of a frame transmitted by the STA 1210.

The AP 1200 may periodically transmit a beacon frame (hereinafter, "BF"). For example, the AP 1200 may transmit a BF at intervals of 100 ms. For example, the BF may include information for power management of a plurality of STAs.

The STA 1210 may be construed as a wireless terminal operating in a power save (hereinafter, "PS") mode. The STA 1210 in the PS mode may switch from an awake state to a doze state. The STA 1210 in the PS mode may switch from the doze state to the awake state.

For example, the awake state may be a state in which an STA can receive a frame from another STA and can transmit a frame to another STA. The sleep state may be a state in which an STA cannot receive a frame from another STA and cannot transmit a frame to another STA.

In a first interval (T1 to T2), the STA 1210 may transmit, to the AP 1200, a target wake time (TWT) request frame for requesting first target beacon transmission time (TBTT) information, which indicates the reception time of a first BF (BF1), and listen interval (hereinafter, "LI") information, which indicates a reception interval for a subsequent BF.

The AP 1200 may transmit a TWT response frame including the first TBTT information and the LI information in response to the TWT request frame. That is, the first interval (T1 to T2), during which the AP and the STA conduct negotiations for the first TBTT information and the LI information, may be construed as a negotiation interval.

The STA 1210 may acquire information on the reception time of the first BF (BF1) from the first TBTT information included in the received TWT response frame. For example, the first TBTT information may be set to indicate the reception time (T3) of the first BF (BF1).

The LI information may be set to a specified value. The STA 1210 may selectively receive BFs (BF1 and BF3) in accordance with a specific interval among a plurality of BFs (for example, BF1, BF2, and BF3) to be transmitted from the AP 1200 based on the LI information.

For example, when the LI information is set to 2, the STA may not receive a second BF that is received subsequent to the first BF. Subsequently, the STA may receive a third BF that is received subsequent to the second BF.

It will be appreciated that although not shown in FIG. 12, other STAs (not shown) may adjust the reception interval between beacon frames to be received from the AP 1200 through an interval for negotiations with the AP 1200.

Details of the TWT request frame and the TWT response frame may be further understood with reference to section 27.5.2.6 of the IEEE P802.11ax/D1.0 standard document, disclosed in November 2016.

At a second time (T2), the STA 1210 may switch to the doze state after receiving the TWT response frame. The STA 1210 may maintain the switched doze state during a second interval (T2 to T3).

At a third time (T3), the STA 1210 may switch to the awake state according to the first TBTT information in order to receive the first BF (BF1). The STA 1210 may receive the first BF (BF1) in a third interval (T3 to T4).

At a fourth time (T4), when the first BF (BF1) is completely received, the STA 1210, which has negotiated with the AP 1200 for the first TBTT information and the LI information via the first interval (T1 to T2), may switch to the doze state.

In a fourth interval (T4 to T5), the STA 1210 may maintain the doze state.

In a fifth interval (T5 to T6), the STA 1210 may not receive the second BF according to the LI information set to 2. That is, in the fifth interval (T5 to T6), the STA 1210 may maintain the doze state.

In a sixth interval (T6 to T7), the STA 1210 may maintain the doze state.

At a seventh time (T7), the STA 1210 may switch to the awake state according to the LI information in order to receive the third BF (BF3). The STA 1210 may receive the third BF (BF3) in a seventh interval (T7 to T8).

While an STA maintains the awake state after receiving a BF in a conventional operation, the STA, which negotiates with the AP for the TBTT information and the LI information according to the present embodiment, may immediately switch to the doze mode upon receiving a beacon frame received at the time of negotiation.

That is, according to the present embodiment, standby power consumption by a wireless terminal may be reduced, thus providing a wireless terminal with improved power efficiency.

Figure 13:
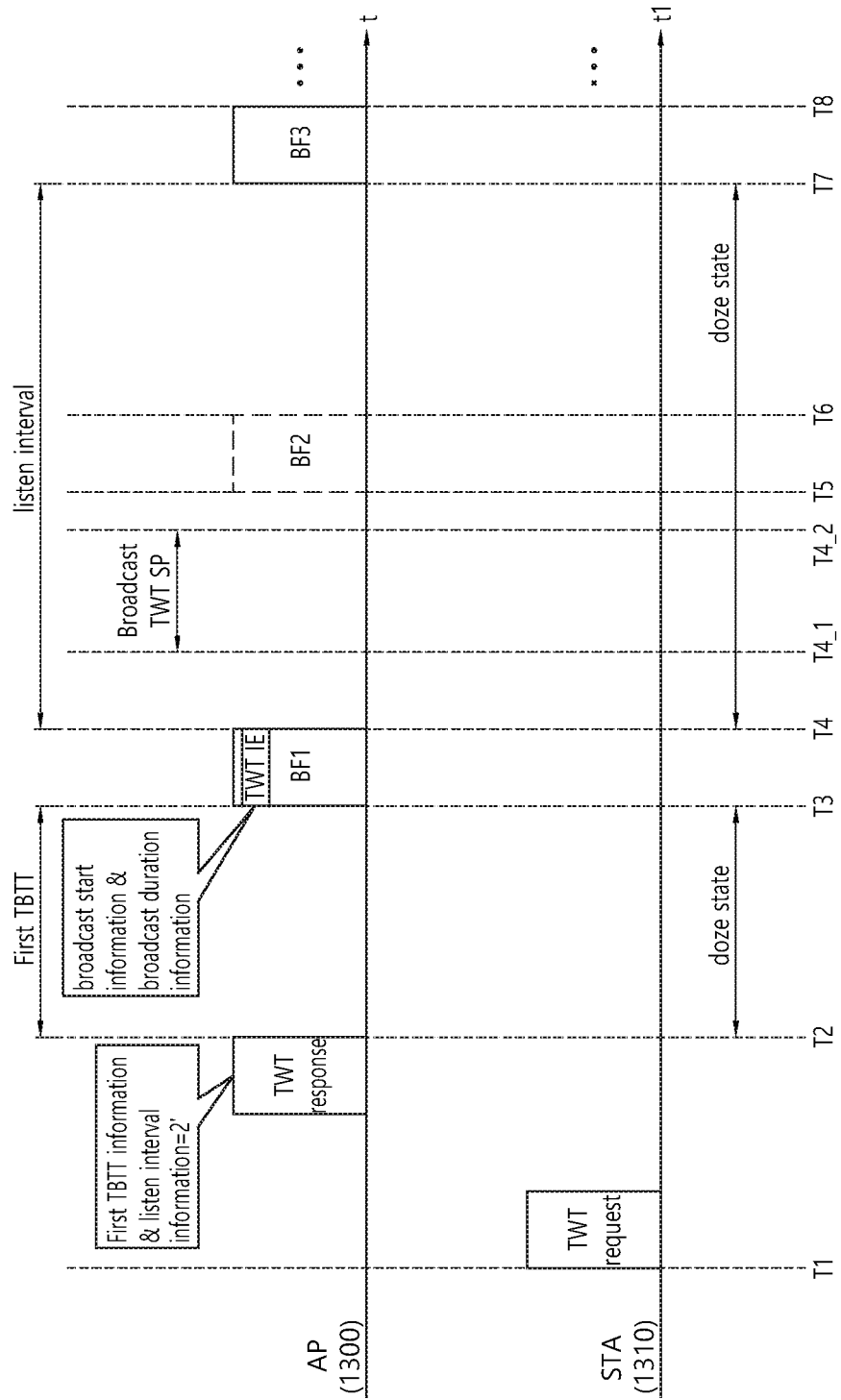
FIG. 13 illustrates a method for managing the power of a wireless terminal in a WLAN system according to another embodiment.

FIG. 13 illustrates a method for managing the power of a wireless terminal in a WLAN system according to another embodiment.

Referring to FIGS. 12 and 13, overall operations of an AP 1300 in a first interval (T1 to T2) to a seventh interval (T7 to T8) illustrated in FIG. 13 may correspond to those of the AP 1200 in the first interval (T1 to T2) to the seventh interval (T7 to T8) described in FIG. 12.

Likewise, overall operations of an STA 1310 in the first interval (T1 to T2) to the seventh interval (T7 to T8) illustrated in FIG. 13 may correspond to those of the STA 1210 in the first interval (T1 to T2) to the seventh interval (T7 to T8) described in FIG. 12.

Referring to FIG. 13, a first BF (BF1) may further include a TWT information element (hereinafter, "TWT IE"). For example, the first BF (BF1) may include a TWT IE as a parameter set for a broadcast TWT service period for a plurality of wireless terminals.

For example, the TWT IE may include start information (for example, T4_1) indicating the start time of the broadcast TWT service period for the plurality of wireless terminals. For example, the TWT IE may include duration information (for example, T4_1 to T4_2) indicating the duration of the broadcast TWT service period (SP). The TWT IE will be described in more detail with reference to the following drawing.

Conventionally, a plurality of other STAs (not shown) receiving the TWT IE may operate in the awake state during the broadcast TWT service period (for example, T4_1 to T4_2).

However, the STA that has negotiated in advance with the AP for TBTT information and LI information according to the present embodiment may continue to stay in the doze mode, regardless of the broadcast TWT service period, until a subsequent BF is received according to a listen interval.

Figure 14:
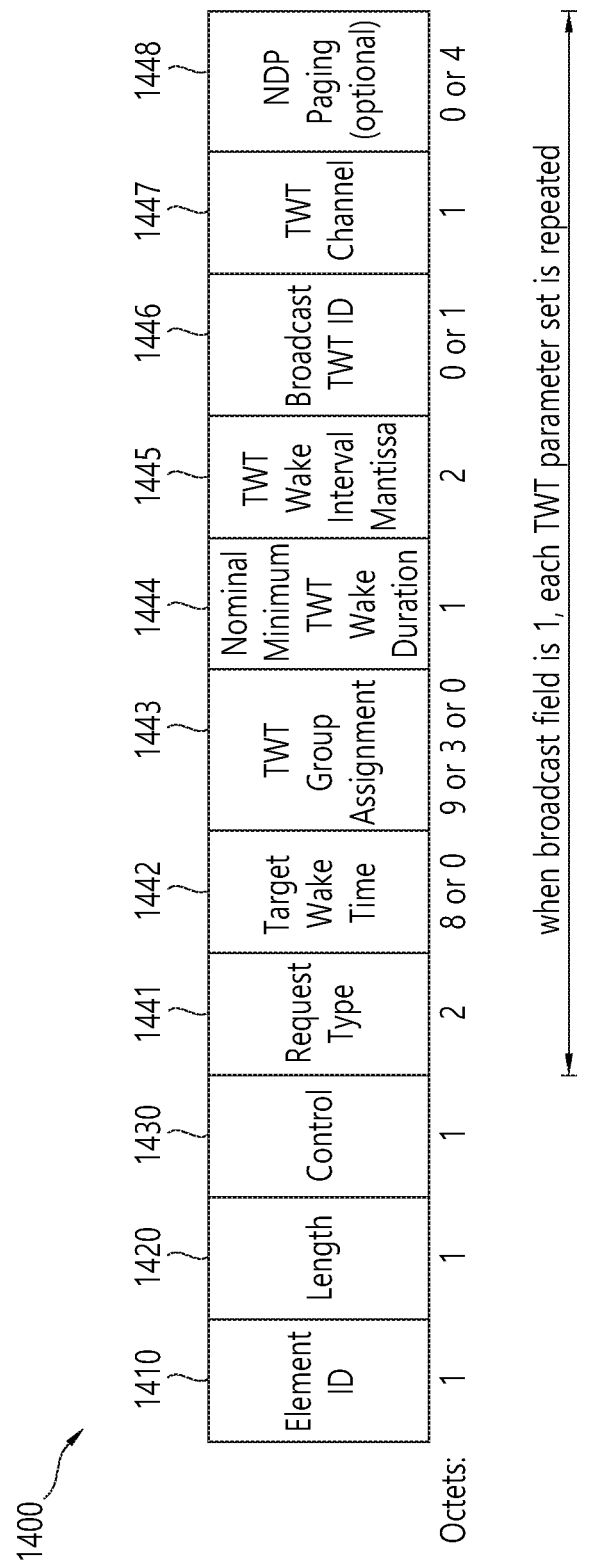
FIG. 14 illustrates a TWT IE according to one embodiment.

FIG. 14 illustrates a TWT IE according to one embodiment.

Referring to FIGS. 1 to 14, the TWT IE described in FIG. 13 may correspond to a TWT element 1400 of FIG. 14. The TWT element 1400 may include a plurality of fields 1410 to 1430 and 1441 to 1448.

One octet may be assigned for an Element ID field 1410. The Element ID field 1410 may be set to a value to indicate a TWT IE among at least one piece of element information included in a BF.

One octet may be assigned for a Length field 1420. The Length field 1420 may be set to a value to indicate the total number of bits assigned for the TWT IE.

One octet may be assigned for a Control field 1430. The Control field 1430 may include an indicator that indicates whether a TWT service period (TWT SP) according to the TWT IE is a broadcast TWT period for a plurality of STAs.

Hereinafter, it is assumed that the Control field 1430 includes an indicator that indicates a broadcast TWT period. The broadcast TWT period may refer to a time interval according to a broadcast scheme for all user STAs receiving a BF.

When the broadcast TWT period is indicated (for example, when the indicator is set to 1), one or more TWT parameter sets 1441 to 1448 may be repeatedly included in the TWT element 1400 as many times as the number of TWT service periods.

For example, when one beacon interval includes a plurality of broadcast TWT periods (for example, a first broadcast TWT period and a second broadcast TWT period), the TWT parameter set 1441 to 1448 may be included twice in the TWT element 1400.

For instance, a first TWT parameter set having the format of the TWT parameter set 1441 to 1448 may be assigned for the first broadcast TWT period. A second TWT parameter set having the format of the TWT parameter set 1441 to 1448 may be assigned for the second broadcast TWT period.

Two octets may be assigned for a Request field 1441. The Request field 1441 may include information indicating the type of a frame allowed to be transmitted/received in the broadcast TWT service period.

When the broadcast TWT period is indicated, eight octets may be assigned for a Target Wake Time field 1442.

The Target Wake Time field 1442 may include information on the start time of the broadcast TWT service period. Specifically, the Target Awake Time field 1442 may include information associated with a timing synchronization function (TSF) timer for waking up an STA receiving the TWT element 1400 in the broadcast TWT service period.

A TWT Group Assignment field 1443 may indicate group information on an STA to receive the TWT element 1400. For example, when the broadcast TWT period is indicated in the TWT element 1400, no TWT Group Assignment field 1443 may be assigned.

One octet may be assigned for a Nominal Minimum TWT Wake Duration field 1444. The Nominal Minimum TWT Wake Duration field 1444 may include information associated with the duration of the TWT service period (TWT SP).

Two octets may be assigned for a TWT Wake Interval Mantissa field 1445. The TWT Wake Interval Mantissa field 1445 may include information on a TWT wake interval associated with the reception time of a subsequent BF.

A Broadcast TWT ID field 1446 may include information for indicating a specified TWT service period (TWT SP) in which an STA requesting the TWT element 1400 is to participate. The Broadcast TWT ID field 1446 may include information for indicating a specified TWT service period (TWT SP) provided by an STA transmitting the TWT element 1400.

A TWT Channel field 1447 may include bitmap information for indicating which channel an STA uses as a temporary primary channel during the TWT service period (TWT SP). An NDP Paging field 1448 may optionally be included in the TWT element 1400.

Details of the TWT element may be further understood with reference to section 9.4.2.200 of the IEEE P802.11ax/D1.0 standard document, disclosed in November 2016.

Figure 15:
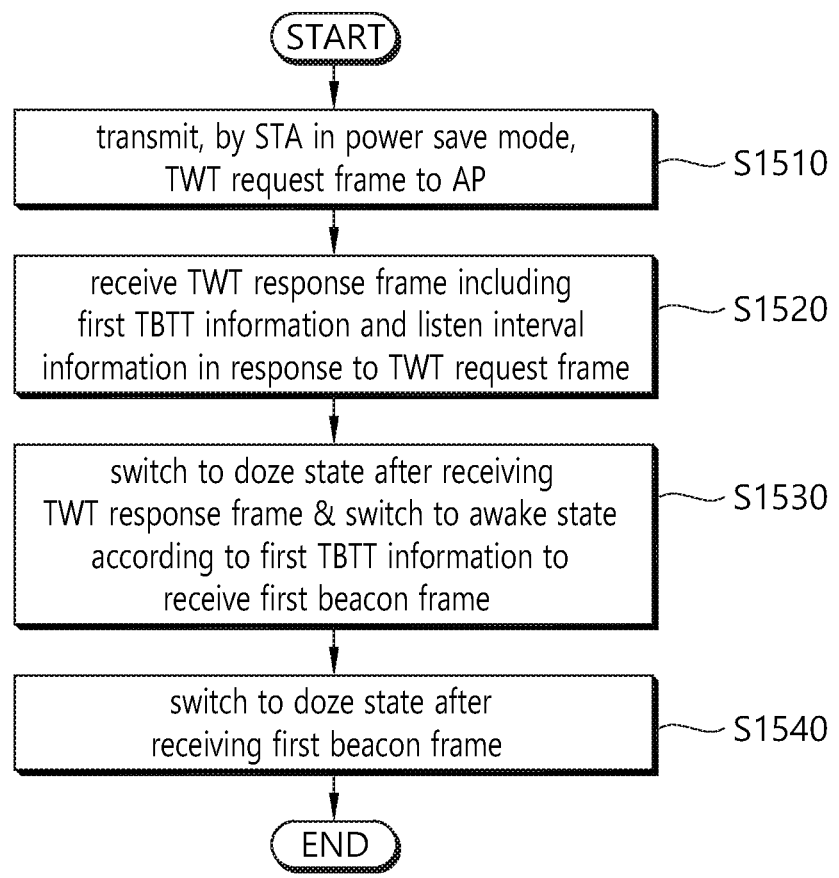
FIG. 15 is a flowchart illustrating a method for managing the power of a wireless terminal in a WLAN system according to one embodiment.

FIG. 15 is a flowchart illustrating a method for managing the power of a wireless terminal in a WLAN system according to one embodiment.

Referring to FIGS. 1 to 15, an STA according to the present embodiment may be a wireless terminal that switches between the awake state and the doze state based on the PS mode for power management.

For example, when the STA is in the awake state, the STA may transmit an uplink frame to an AP or may receive a downlink frame from the AP.

When the STA is in the doze state, the STA may not transmit an uplink frame to the AP or may not receive a downlink frame from the AP.

In step S1510, the STA may transmit, to the AP, a target wake time (TWT) request frame for requesting first target beacon transmission time (TBTT) information, which indicates the reception time of a first beacon frame, and listen interval information, which indicates a reception interval for a subsequent beacon frame.

In step S1520, the STA may receive, from the AP, a TWT response frame including the first TBTT information and the listen interval information in response to the TWT request frame.

In step S1530, the STA may switch to the doze state after receiving the TWT response frame. Subsequently, the STA may switch to the awake state according to the first TBTT information in order to receive the first beacon frame.

In step S1540, the STA may switch to the doze state after receiving the first beacon frame.

Figure 16:
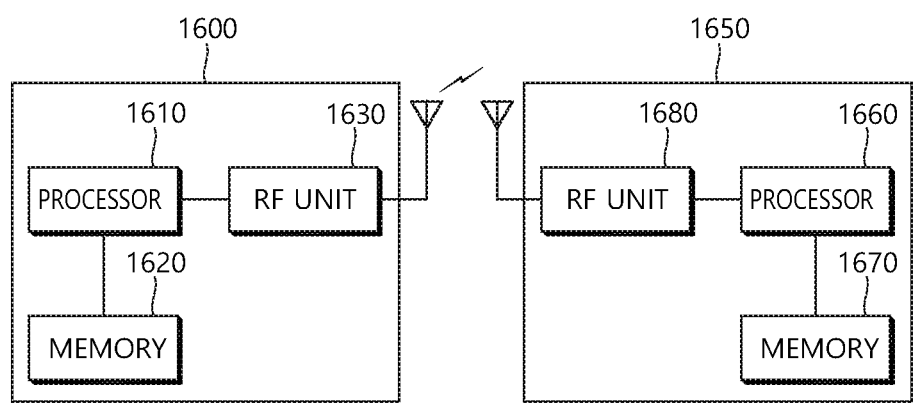
FIG. 16 is a block view illustrating a wireless device to which the exemplary embodiment of the present invention can be applied.

FIG. 16 is a block view illustrating a wireless device to which the exemplary embodiment of the present invention can be applied.

Referring to FIG. 16, as an STA that can implement the above-described exemplary embodiment, the wireless device may correspond to an AP or a non-AP station (STA). The wireless device may correspond to the above-described user or may correspond to a transmitting device transmitting a signal to the user.

The AP 1600 includes a processor 1610, a memory 1620, and a radio frequency (RF) unit 1630.

The RF unit 1630 is connected to the processor 1610, thereby being capable of transmitting and/or receiving radio signals.

The processor 1610 implements the functions, processes, and/or methods proposed in the present invention. For example, the processor 1610 may be implemented to perform the operations according to the above-described exemplary embodiments of the present invention. More specifically, among the operations that are disclosed in the exemplary embodiments of FIG. 1 to FIG. 16, the processor 1610 may perform the operations that may be performed by the AP.

The non-AP STA 1650 includes a processor 1660, a memory 1670, and a radio frequency (RF) unit 1680.

The RF unit 1680 is connected to the processor 1660, thereby being capable of transmitting and/or receiving radio signals.

The processor 1660 implements the functions, processes, and/or methods proposed in the present invention. For example, the processor 1660 may be implemented to perform the operations of the non-AP STA according to the above-described exemplary embodiments of the present invention. The processor may perform the operations of the non-AP STA, which are disclosed in the exemplary embodiments of FIG. 1 to FIG. 16.

The processor 1610 and 1660 may include an application-specific integrated circuit (ASIC), another chip set, a logical circuit, a data processing device, and/or a converter converting a baseband signal and a radio signal to and from one another. The memory 1620 and 1670 may include a read-only memory (ROM), a random access memory (RAM), a flash memory, a memory card, a storage medium, and/or another storage device. The RF unit 1630 and 1680 may include one or more antennas transmitting and/or receiving radio signals.

When the exemplary embodiment is implemented as software, the above-described method may be implemented as a module (process, function, and so on) performing the above-described functions. The module may be stored in the memory 1620 and 1670 and may be executed by the processor 1610 and 1660. The memory 1620 and 1670 may be located inside or outside of the processor 1610 and 1660 and may be connected to the processor 1610 and 1660 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for managing power of a wireless terminal in a wireless local area network (WLAN) system, the method comprising:

transmitting, by a first wireless terminal that switches between an awake state and a doze state based on a power save mode for power management, a target wake time (TWT) request frame for requesting first target beacon transmission time (TBTT) information and listen interval information to a second wireless terminal, wherein the first TBTT information is related to a reception time of a first beacon frame, and wherein the listen interval information is related to a reception interval for a subsequent beacon frame that the first wireless terminal is intended to receive;

receiving, by the first wireless terminal, a TWT response frame including the first TBTT information and the listen interval information from the second wireless terminal in response to the TWT request frame;

switching, by the first wireless terminal, to the doze state after receiving the TWT response frame;

switching, by the first wireless terminal, to the awake state based on the first TBTT information in order to receive the first beacon frame;

receiving, by the first wireless terminal, the first beacon frame from the second wireless terminal, wherein the first beacon frame includes first information related to a start time of a broadcast TWT service period for a plurality of wireless terminals and second information related to a duration of the broadcast TWT service period;

switching, by the first wireless terminal, to the doze state after receiving the first beacon frame; and maintaining, by the first wireless terminal, the doze state until the subsequent beacon frame is received based on the listen interval information regardless of the first information and the second information included in the first beacon frame.

2. The method of claim 1, wherein the listen interval information is set to a value corresponding to 2, and the method further comprises:

not receiving, by the first wireless terminal, a second beacon frame based on the listen interval information, when the first wireless terminal is in the doze state; and receiving, by the first wireless terminal, a third beacon frame based on the listen interval information, when the first wireless terminal is in the awake state.

3. The method of claim 2, wherein the second beacon frame is a frame received subsequent to the first beacon frame, the third beacon frame is a frame received subsequent to the second beacon frame, and the first to third beacon frames are frames periodically transmitted by the second wireless terminal.

4. The method of claim 1, wherein when the first wireless terminal is in the awake state, the first wireless terminal transmits an uplink frame to the second wireless terminal or receives a downlink frame from the second wireless terminal, and when the first wireless terminal is in the doze state, the first wireless terminal transmits no uplink frame to the second wireless terminal or receives no downlink frame from the second wireless terminal.

5. A first wireless terminal using a method for managing power of a wireless terminal in a wireless local area network (WLAN) system, the first wireless terminal comprising:

a transceiver to transmit and receive a radio signal; and a processor connected to the transceiver, wherein the processor is configured to:

transmit a target wake time (TWT) request frame for requesting first target beacon transmission time (TBTT) information and listen interval information to a second wireless terminal, wherein the first wireless terminal switches between an awake state and a doze state based on a power save mode for power management, wherein the first TBTT information is related to a reception time of a first beacon frame, and wherein the listen interval information is related to a reception interval for a subsequent beacon frame that the first wireless terminal is intended to receive;

receive a TWT response frame including the first TBTT information and the listen interval information from the second wireless terminal in response to the TWT request frame;

switch to the doze state after receiving the TWT response frame;

switch to the awake state based on the first TBTT information in order to receive the first beacon frame;

receive the first beacon frame from the second wireless terminal, wherein the first beacon frame includes first information related to a start time of a broadcast TWT service period for a plurality of wireless terminals and second information related to a duration of the broadcast TWT service period;

switch to the doze state after receiving the first beacon frame; and maintain the doze state until the subsequent beacon frame is received based on the listen interval information regardless of the first information and the second information included in the first beacon frame.

6. The first wireless terminal of claim 5, wherein the listen interval information is set to a value corresponding to 2, the processor is further configured not to receive a second beacon frame based on the listen interval information, when the first wireless terminal is in the doze state, and the processor is further configured to receive a third beacon frame based on the listen interval information, when the first wireless terminal is in the awake state.

7. The first wireless terminal of claim 6, wherein the second beacon frame is a frame received subsequent to the first beacon frame, the third beacon frame is a frame received subsequent to the second beacon frame, and the first to third beacon frames are frames periodically transmitted by the second wireless terminal.

\* \* \* \* \*